May 21, 1929. J. R. GAMMETER 1,714,016
METHOD AND APPARATUS FOR VULCANIZING HOLLOW ARTICLES
Filed April 1, 1926 4 Sheets-Sheet 1
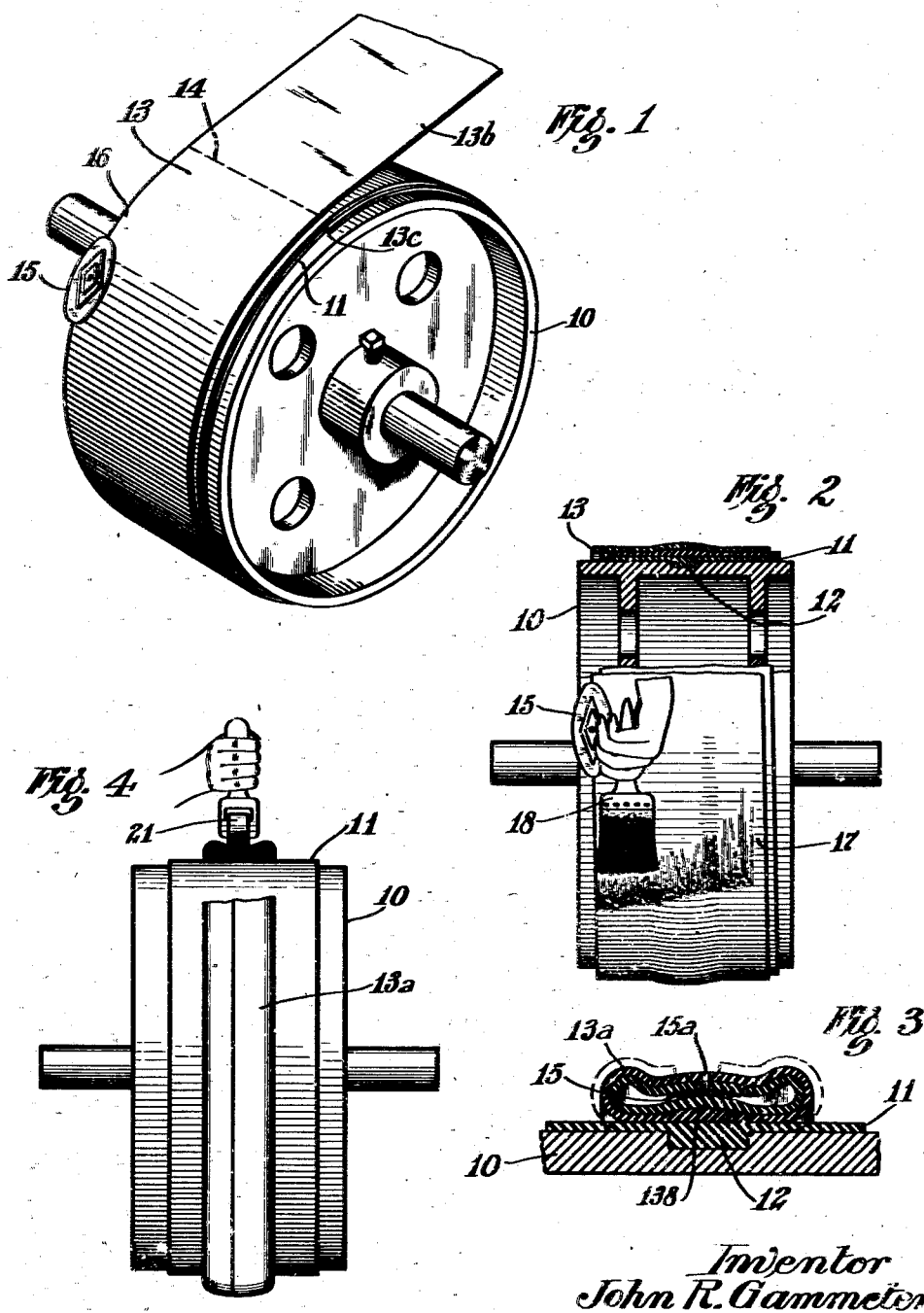
Inventor
John R. Gammeter
By Pierson, Eakin & Cary
Attys.

May 21, 1929. J. R. GAMMETER 1,714,016
METHOD AND APPARATUS FOR VULCANIZING HOLLOW ARTICLES
Filed April 1, 1926 4 Sheets-Sheet 2
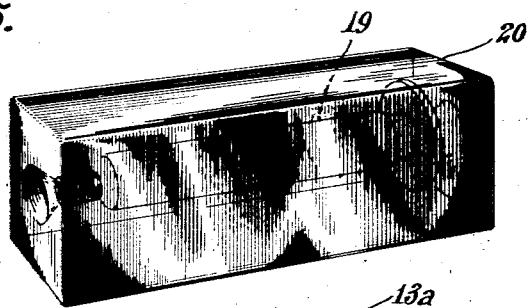
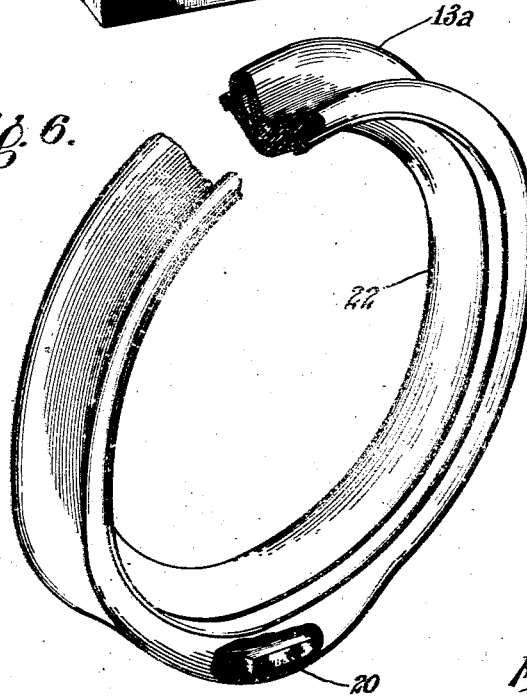
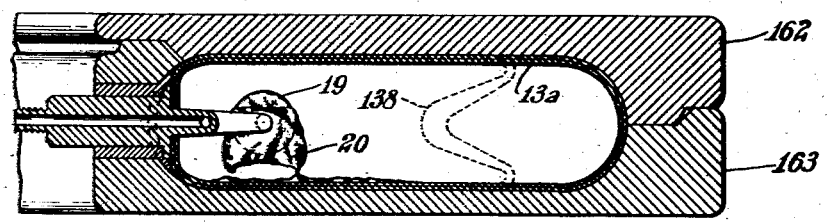
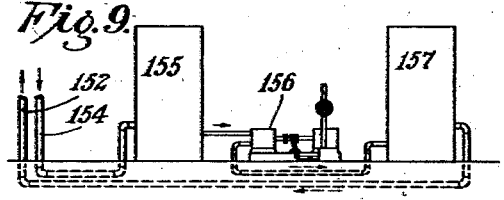
Inventor
John R. Gammeter May 21, 1929.  J. R. GAMMETER  1,714,016
METHOD AND APPARATUS FOR VULCANIZING HOLLOW ARTICLES
Filed April 1, 1926  4 Sheets-Sheet 3
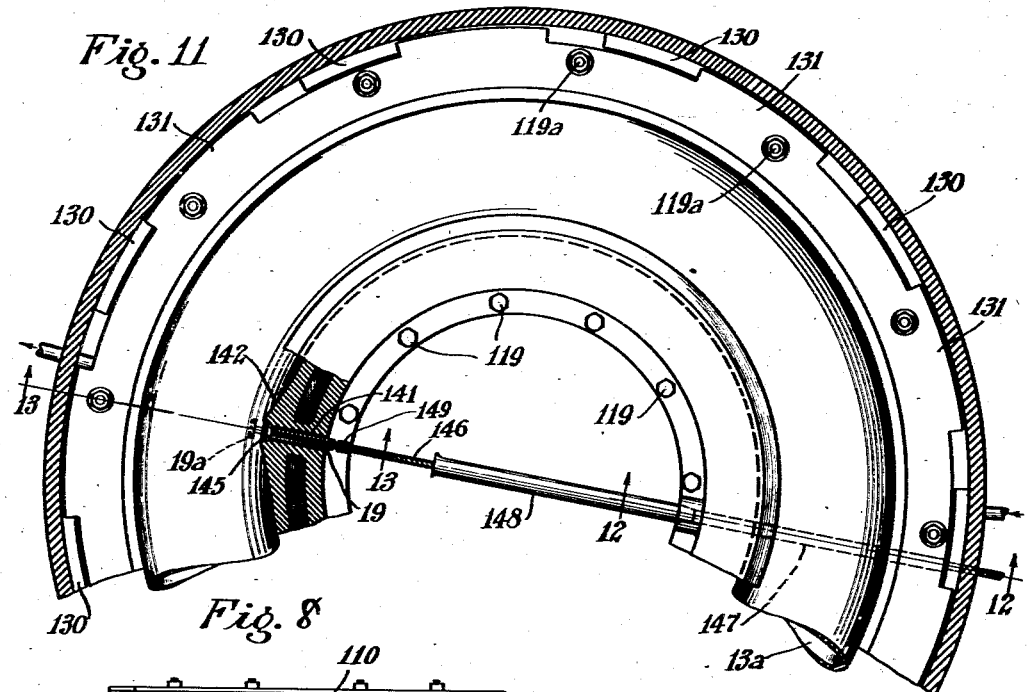
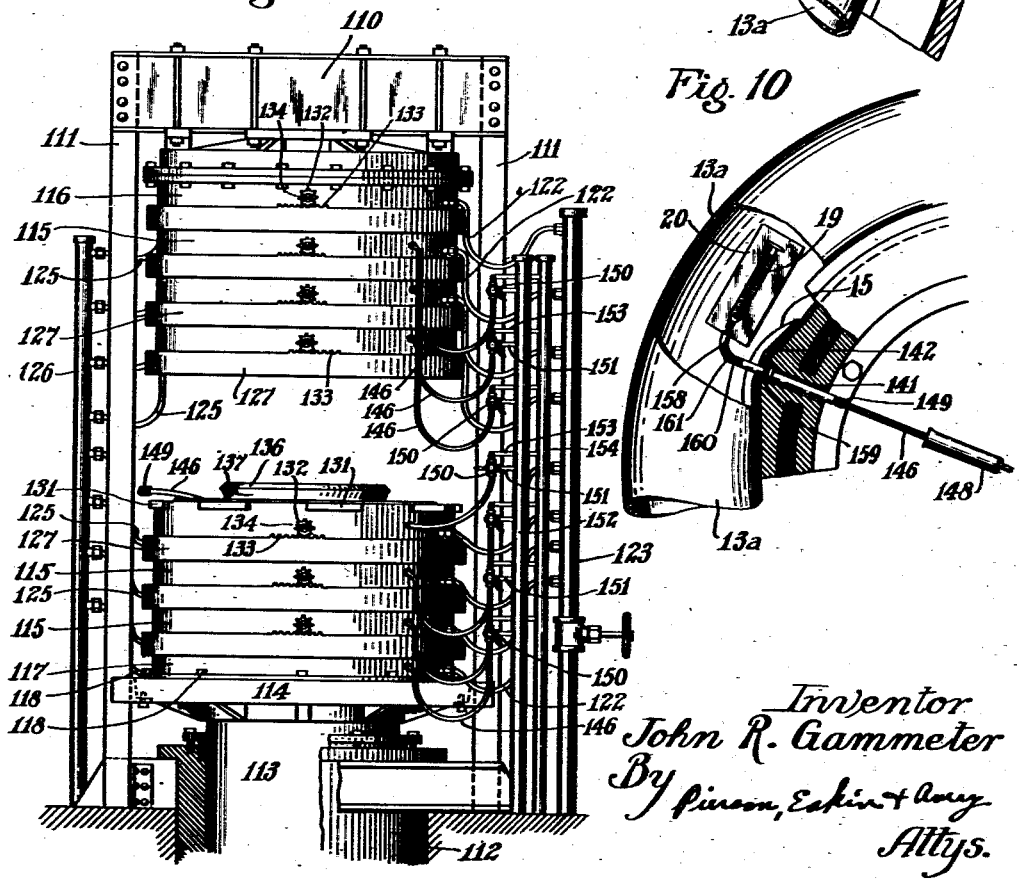
Inventor
John R. Gammeter
By Pierson, Eskin + Aury
Attys.

Inventor
John R. Gammeter
By Pierson, Eakin & Amy
Attys.

Patented May 21, 1929.

1,714,016

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR VULCANIZING HOLLOW ARTICLES.

Application filed April 1, 1926. Serial No. 98,988.

This invention relates to the manufacture of hollow rubber articles such as inner tubes for tires and especially to procedure and apparatus for vulcanizing the same under internal fluid pressure employed to distend the article against a vulcanizing mold.

Heretofore the vulcanization of inner tubes and the like has involved certain problems such as the matter of displacing air contained within the article in order to avoid oxidation of the latter and in order to obtain a uniform heat distribution, and the matter of expelling air from between the article and the mold in order to avoid the forming of blemishes on the outer surfaces of the article.

My chief objects are to provide improved procedure and apparatus whereby such difficulties may readily be overcome, to provide vulcanizing apparatus adapted for quick and easy insertion and removal of the work, and to provide improved apparatus wherein the articles may be vulcanized in overlapping periods, mold changes being affected in succession from one end to the other of a series of vulcanizing molds constituting a single operating unit while all of the molds continue in service except the one in which a vulcanized article is being replaced by an article to be vulcanized. A more specific object is to provide improved procedure and apparatus for molding and vulcanizing under internal fluid pressure an inner tube which before vulcanization normally assumes a transversely flattened form, with its tread portion of but slightly greater diameter than its inner periphery, as in the case of inner tubes built by bringing together and longitudinally seaming the side margins of an annular sheet of stock mounted upon a building drum.

Of the accompanying drawings:

Fig. 1 is a perspective view of a tube-building drum adapted to carry out a step of my process, with the work in place thereon.

Fig. 2 is a side elevation of the same, at a later stage of operation, parts being sectioned and broken away.

Fig. 3 is a section of a part of the drum and the work thereon at a later stage.

Fig. 4 is a side elevation of the same at a still later stage of operation.

Fig. 5 is a perspective view of a block of gelatin encasing an inner-tube valve-stem to prevent the latter from damaging an inner tube in which it is enclosed in the practice of my invention.

Fig. 6 is a perspective view of cooling and shaping ring or rim with an inner tube mounted thereon, parts being sectioned and broken away.

Fig. 7 is a section of a mold of a type that may be used in the practice of my invention, with the work therein.

Fig. 8 is a side elevation, with parts broken away and in section, of a vulcanizer embodying and adapted to carry out certain features of my invention in its preferred form.

Fig. 9 is a diagrammatic elevation of fluid circulating means for distending the articles during vulcanization.

Fig. 10 is a fragmentary horizontal section, on a larger scale, of the preferred type of mold, the said section being taken on such planes as to show in plan an inner tube mounted in the mold, as it appears at an early stage of the vulcanizing operation.

Fig. 11 is a similar fragmentary, horizontal section of the preferred mold assembly, showing alternative procedure with respect to the valve-stem.

Figure 12:
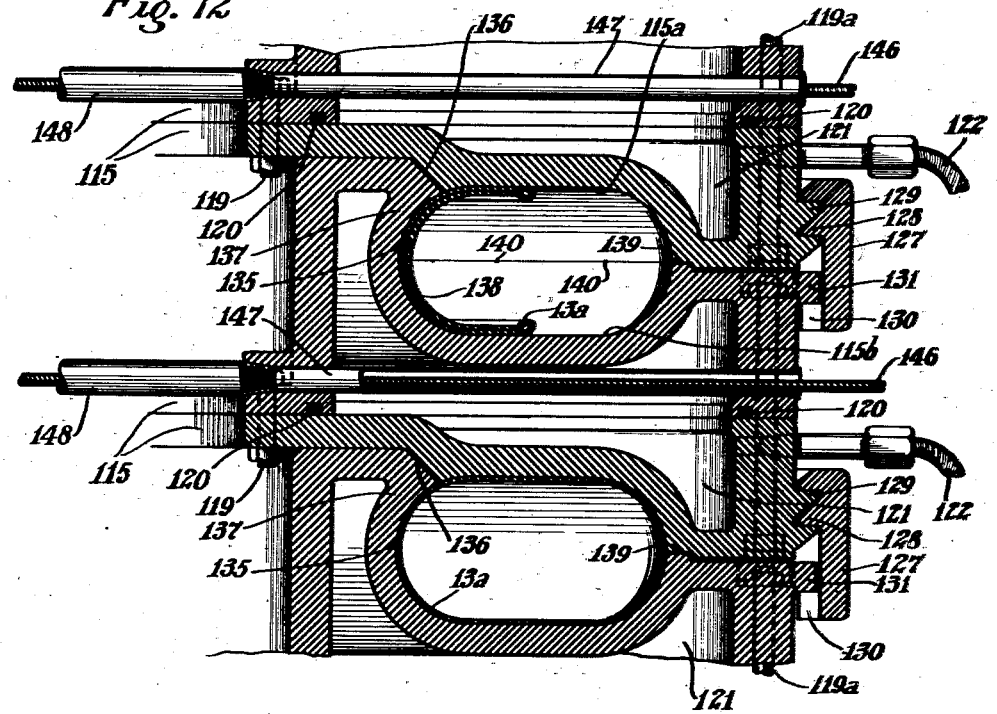
Fig. 12 is a section on line 12—12 of Fig. 11.

Referring to the drawings, the tube is preferably built upon a drum 10 which is adapted to be mounted for rotation and has upon its outer face an annular band 11 of flexible, elastic, non-adhesive material such as vulcanized rubber, this band preferably being formed with a middle rib 12 on its inner face, set into a groove on the surface of the drum, so as to maintain the band properly centered upon the drum.

In the practice of my method in its preferred form, a strip 13 of calendered stock is drawn from a source of supply such as a calender and wound upon the drum 10 over the band 11, the winding being given such helical form that the margins of each turn of the material are slightly off-set from those of the preceding turn, as will be understood upon reference to Figs. 1 and 2.

The successive convolutions may be progressively compacted against each other by any suitable rolling means during the winding operation and when the stock is drawn directly from the calender the warm and tacky condition of the rubber results in strong adhesion of the plies.

When the desired number of plies have thus been drawn onto the drum, the strip 13 is severed, as upon the line 14 of Fig. 1, preferably at the same position circumferentially of the drum as that of the leading end 13ᶜ of the winding, and the residue 13ᵇ of the stock strip is freed from the drum assembly.

A valve stem patch 15 is then mounted upon the margin 16 of the winding at which the last wound ply overhangs the underlying plies as shown in Figs. 1 and 2. The exposed outer surface of the winding, except the margin 17 (Fig. 2) opposite that to which the valve stem pad is attached, is treated with a wash constisting of a highly volatile liquid containing a suitable substance in solution or suspension to prevent adhesion of the rubber when the solvent evaporates, which occurs quickly because of the warm condition of the stock when it is drawn directly from the calender. A suitable wash for this purpose is a solution, which may be super-saturated, of stearic acid in alcohol. The wash readily may be applied by means of a paint brush 18, Fig. 2, held against the work while the drum is rotated.

After the solvent has evaporated, the margin 16, upon which the valve stem patch is mounted, is progressively turned over to approximately the middle line of the assembly, together with the adjacent margin of the non-adhesive underlying band 11, which may be readily accomplished by rotating the drum and manipulating the said margins with a suitable turning tool, as will be readily understood by those skilled in the art.

The opposite margins of the band 11 and of the work are then similarly turned over and the margins of the winding of the tacky rubber strip 13 are progressively joined together in the mis-matched, interfitted relation which is clearly shown in Fig. 3. The portion of the valve stem patch 15 which projects from the margin 16 contacts and is stuck to the inner face of the inner ply of the margin 17, so that it lies within the resulting tube, bridging the seam. The seaming operation is preferably started at the position of the valve stem patch 15, and the valve stem hole 15ᵃ is punched in the structure before the seaming has further progressed, after which the seaming operation is completed. During the seaming operation the valve stem 19, encased in a block 20 of gelatin or the like (see Figs. 5 and 6), adapted to prevent the valve-stem from damaging the uncured tube during handling or storage, is placed within the tube 13ᵃ as the latter is formed from the winding 13. The seam is then compacted by rotating the drum with the work thereon while holding a roller 21 (Fig. 4) against the middle portion of the work.

The tube is then removed from the drum, turned so that the seam and valve stem patch are on its inner periphery, and is mounted upon a cooling and shaping rim 22 (Fig. 6) which is of an obtuse U-form in cross-section and of such size with relation to the tube 13ᵃ as slightly to tension the latter and cause it to assume a double-walled U-form in cooling, and to be substantially free of contained air.

When the tube has cooled and consequently has set in this double-walled U-form it is removed from the rim 22 and is vulcanized in a mold under internal fluid pressure, preferably in the apparatus shown in Figs. 8 to 13.

The said apparatus comprises a vertical press having a stationary upper head 110 supported upon standards 111, 111, which are secured at their lower ends to a ram cylinder 112 in which is mounted a ram 113 carrying the lower press-head 114.

A series of steam-jacket mold members is provided for vulcanizing the articles in the press, the said series comprising intermediate mold members 115, 115, each formed with an annular mold cavity 115ᵃ in its lower face and an annular mold cavity 115ᵇ in its upper face (Figs. 12 and 13), the adjacent cavities of adjacent mold members being adapted to mate.

A mold member 116 of appropriately modified form, having a mold cavity only in its lower face, is provided as the uppermost member of the series and is suitably secured to the upper press-head 110, the several mold members being provided with means for securing each member to the next in the series so that any desired number of the mold members may be suspended from the upper press-head while a lower member or members of the series may be withdrawn downward from those so suspended in order to open the mold cavity defined by any two adjacent mold members. This construction is such as to permit the removal of a vulcanized article from the cavity thus opened and the substitution of an article to be vulcanized, while all of the other mold cavities are kept closed to continue the vulcanizing of the articles therein.

A mold member 117 of suitably modified construction, having a mold cavity only in its upper face, is provided at the bottom of the series and is maintained in properly centered position upon the lower press-head 114 by suitable lugs 118, 118 formed upon the latter, and is preferably secured to the lower press-head, in any suitable manner, in order that the weight of the ram may supplement the weight of the lowermost mold member and any others that may be locked thereto to assure the opening of the selected mold cavity when the fluid pressure upon the ram is released.

Figure 13:
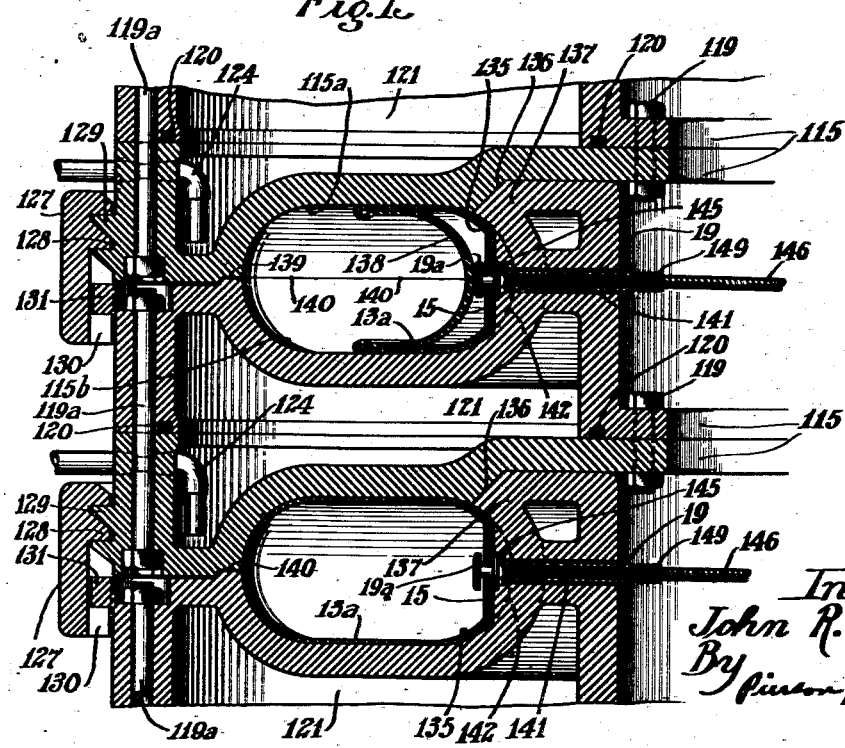
Fig. 13 is a section on line 13—13 of Fig. 11.

For convenience of construction each of the mold members 115 is preferably formed in two sections, as shown clearly in Figs. 12 and 13, the said sections being secured together by bolts 119, 119, 119ª, 119ª, and sealed to each other as by gaskets 120, 120, the two sections of each member 115 defining between them a steam cavity 121 provided with a flexible steam inlet pipe 122 running from a steam manifold 123 (Fig. 8), and with an outlet siphon 124 communicating with a flexible pipe 125 running to an outlet manifold 126, for venting water of condensation from the lowermost part of the steam cavity.

The means for locking adjacent mold members together, as to each pair of adjacent mold members, comprises a locking ring 127 formed with an internal screw-thread 128 meshed with a male thread 129 formed upon the upper mold member of the pair, the locking ring also being formed near its lower margin with a circumferential series of locking lugs 130, 130, adapted to pass freely between locking lugs 131, 131, formed upon the lower mold member of the pair, when the two mold members are moved axially with relation to each other, and to interlock with the said lugs 131, when the mold members are brought together and the locking-ring is rotated upon the screw-thread 129, the pitch of the screw-threads 128 and 129 preferably being such that the locking lugs 130 and 131 may be brought tightly together by the rotation of the locking ring upon the thread 129.

Suitable means, such as a pinion 132 mounted upon the upper mold member of the pair and meshed with a set of rack-teeth 133 formed on the upper edge of the locking ring, may be provided for rotating each of the locking rings, the hub of the pinion being formed with a hole 134 to receive a crank or turn-bar.

The walls of the mating mold cavities 115ª and 115ᵇ, when the apparatus is designed for vulcanizing inner tubes, are preferably so formed as to define a complete mold cavity which is of flattened or oblate form in cross-section, as shown in Figs. 12 and 13, in order that a comparatively large number of the mold members may be employed in a single press of given height and in order that the mold members may be of comparatively light weight, to avoid excessive strain upon the locking means and in order that a large power consumption will not be required for raising and lowering the mold members.

The walls of the mating cavities 115ª and 115ᵇ also are preferably so formed that the lower mold member of the pair will present an uninterrupted face 135 (Figs. 12 and 13) to the inner tube throughout a zone transversely extending for a considerable distance in each direction from the middle line of the inner periphery of the tube, the mold members having annular inner meeting surfaces at 136, well above the said middle line, this construction providing an annular, button-like (see Fig. 8), inner margin 137 of the lower mold member, said button-like margin being adapted to receive an inner tube stretched or "buttoned" thereover when the mold cavity is open and to hold the tube in a desirable form for the closing of the mold cavity without pinching of the tube. This feature is of especial value when the inner tube is presented to the mold while collapsed and bent to a double-walled U-form, as is shown with respect to the tube 13ª in Figs. 12 and 13.

The walls 115ª and 115ᵇ are preferably so formed at the outer periphery of the mold cavity as to meet in a parting plane 139 at the middle line of the outer periphery of the mold cavity, so that as the collapsed tube 13ª is expanded by the pressure fluid injected thereinto and extends its contact with the mold cavity walls progressively toward the said outer, peripheral parting plane the air contained within the mold cavity, outside the tube, will be completely expelled through such spaces as occur between the mold members at the said parting plane or through vent channels 140, 140 which may be especially provided in the mold members at the parting plane for that purpose.

The lower mold member as to each complete mold cavity is formed with an aperture 141 through its inner peripheral wall adapted to receive alternatively an L-shaped valve-stem-supporting and fluid-conducting bar or pipe 158 or the valve stem 19 of the inner tube 13ª contained in the said cavity, and with a fillet 142 providing a flat surface about the mold-cavity end of the aperture so that the valve-stem patch 15 and the wall of the inner tube thereat may be vulcanized in a flat condition throughout the area to be contacted by the head 19ª of the valve-stem and the valve-stem nut 145, as this is desirable to obtain a good sealing of the valve-stem to the tube upon the subsequent setting up of the valve-stem nut when the valve-stem, during vulcanization, is held with its head out of contact with the tube.

In the preferred procedure shown in Fig. 10, the valve-stem 19 is supported wholly within the tube but out of contact therewith during vulcanization by means of the L-shaped supporting bar 158, which has its end portion within the tube adapted to fit with a frictional hold in the mouth of the valve-stem, the bar at the other side of its elbow being adapted to extend through the aperture 141 of the mold member and being formed with a flange 159 adapted to seat in a counterbore formed in the fillet 142 at the end of the said aperture. The said bar is formed with a fluid passage 160 having a discharge outlet 161 at the bar's elbow, directed tangentially of the tube 13ª, so as to inject the distending fluid tangentially of the tube and thus avoid scorching of the wall of the tube when steam or other hot gas is used as the distending medium. The said passage 160 leads to the said outlet 161 from the end of the radially disposed portion of the bar, which is so formed as to receive the coupling member 149 of a flexible, fluid-injecting pipe 146.

Alternatively the counter-bored aperture 141 in the mold is adapted to accommodate the valve-stem 19 and valve-stem nut 145 with the tube contacting face of the latter flush with the plane face of the fillet 142, so that with the valve-stem nut screwed to a proper position upon the valve-stem the head of the latter will stand away from the valve-stem patch 15 when the tube wall is sealed against the fillet and valve-stem nut, as shown in Figs. 11 and 13.

The flexible pipe 146, for injecting pressure fluid into the tubes and withdrawing it therefrom, loosely and slidably extends through a tube 147 (Fig. 12) traversing the steam cavity 121 of each of the mold members having an upwardly-facing mold cavity, in a region diametrically opposite the mold member's fluid-inlet aperture, the tube 147 being sealed to the respective walls of the steam cavity, and the said pipe 146 also extends slidably through a supporting tube 148 projecting from the inner peripheral wall of the annular mold member, into the central space thereof, toward the mold's fluid-inlet aperture.

Each of the flexible pipes 146 is provided at its inner end with a coupling member 149 adapted to be connected with the valve-stem-supporting bar 158 and also, when disconnected therefrom, to abut the adjacent end of the supporting tube 148 so as to be held within convenient reach for connection to the valve-stem-supporting bar for the vulcanization of the next inner tube.

Each of the flexible pipes 146 extends to a three-way valve 150, with slack sufficient to permit the separating of the mold members and the drawing of the pipe through the tubes 147, 148 to connect it with successive inner tubes, each of the three-way valves 150 being connected through a pipe 151 with a pressure-fluid manifold 152 (Fig. 8) and through a pipe 153 with a suction manifold 154.

The suction manifold 154 has connection to the pressure manifold 152 through an accumulator 155, a pump 156 and a pressure tank 157, so that the inert gas which I preferably use for distending the tubes may be saved and used in successive vulcanizing operations.

In mounting the valve stem 19 upon the supporting-bar 158 the gelatin block 20, shaken down to the position of the valve-stem aperture in the tube, is grasped through the medium of the wall of the tube and is thus stuck onto the supporting bar. This may be done without uncoupling the member 149 from the supporting bar, if desired, as the bar and the coupling member 149 and the flexible pipe 146 attached thereto may be drawn outward through the aperture 141 of the mold member, so that the member 149 and pipe occupy the position in which they are shown with respect to the open mold cavity in Fig. 8, and then drawn back to vulcanizing position after the mounting of the valve-stem upon the supporting-bar, but I prefer to mount the valve-stem upon the supporting-bar first and thereafter connect the coupling member 149.

During the vulcanization of the tube the gelatin or the like melts and runs from the valve-stem onto the floor of the tube and, when a dry distending gas is used, loses its moisture sufficiently to become brittle and be reduced to a powder in the subsequent handling of the tube, so that it does not interfere with the proper functioning of the tube in service.

In operation of the vulcanizer, the mold members being heated by a circulation of steam through their steam cavities 121, the mold cavities are opened and closed one after another for the removal of a vulcanized tube and the insertion of another tube to be vulcanized, this operation preferably being performed with respect to the several mold cavities in succession from one end of the series to the other, only one mold cavity being open at any given time, so that the vulcanization of the tubes in the other cavities will continue during the mold change.

In making a mold change, the mold members all being locked together by the locking rings 127 and the tubes being held in an expanded condition in the molds by fluid pressure applied through the pipes 146, the pressure fluid is then withdrawn from the tube that is to be removed from the mold, by operating the valve 150 to shut off the supply of pressure fluid through the pipe 151 and connect the interior of the tube with the suction manifold 154 through the pipe 153, which results in the tube being evacuated and consequently collapsed within the mold to the form shown in Fig. 13, which it had at the beginning of the vulcanizing operation, the pressure of air entering through the channels 140 acting to strip the tread portion of the tube progressively from the molding surfaces.

The valve 150 is then turned to a position such as to close all three of the pipes 146, 151 and 153, and the mold cavity is opened by rotating the locking ring 127 to disengage its lugs from those of the lower mold member and by lowering the ram 113. The vulcanized tube is then removed from the lower mold member, the part adjacent the valve stem aperture being removed last and the coupling member 149 and the flexible pipe 146 being drawn outward through the aperture 141 of the mold member to the position in which they are shown with respect to the open mold cavity in Fig. 8. The coupling member 149 of the pipe 146 is then disconnected from the valve-stem-supporting bar 158, the latter is removed from the tube, the valve-stem is worked into place in the valve-stem aperture, and a valve-stem nut 145 is screwed onto the valve-stem and set up to clamp the valve-stem patch 15 and the underlying wall of the tube between the said nut and the valve-stem head 19ª, to seal the valve-stem in place, the tube then being ready for service.

An uncured tube with the valve-stem and the valve-stem-supporting bar assembled therewith as above described is then mounted in the lower mold member by stretching it over or "buttoning" it onto the annular flange 137, which cooperates with the floor of the mold cavity to hold the tube approximately in the U-form of Figs. 12 and 13, for reception of the upper mold member without pinching of the tube. In the mounting of the tube the portion of the tube adjacent the valve stem is first placed in the mold and brought against the flange 137 while the valve-stem-supporting bar 158 is inserted through the aperture 141 of the mold, and the tube is then stretched over the flange 137 into the mold cavity throughout the rest of its circumference and the flexible pipe 146 is connected up with the bar 158, by means of the coupling 149. The ram 113 is then raised to close the mold cavity and two mold members defining the same are then locked together by means of the ring 127.

The valve 150 is then turned to connect the pressure manifold 152 with the interior of the tube, and the pressure fluid flowing into the latter through the valve-stem causes the collapsed tube 13ª (see Fig. 13) to fill out to the form of the mold cavity, the annular folds of the tube at the ends of the arms of the U being caused to move outward in the mold cavity by a rolling action such that the tube extends its contact with the mold progressively toward the outer parting-plane of the mold members. The air contained in the mold cavity, outside of the tube, is thus completely expelled through the channels 140, with consequent avoidance of blemishing of the exterior surfaces of the tube during vulcanization. The tube is thus vulcanized while distended against the mold, and meanwhile mold changes as just described are effected with respect to other mold cavities of the series.

When the tubes are mounted in the mold cavities in collapsed condition as just described, to which I however do not wholly limit my invention, the tube is preferably formed with a comparatively thick tread wall 138, as by calendering the strip 13 with relatively thick and thin zones, as shown clearly in Fig. 3, so that the longitudinal stretching of the said tread wall incident to its moving outward from its comparatively small-diameter position (Fig. 13) to its final position against the tread wall of the mold does not result in an excessively thin tread wall in the finished tube. Such initial thickness of the tread wall is desirable also to compensate for transverse stretching of the tread wall in case the tube is made of such size in cross-section as to be transversely stretched in filling out to mold form.

The operation of the apparatus in the modified procedure illustrated in Figs. 11, 12 and 13 is substantially the same as that just described except that the valve-stem 19 is mounted in the wall of the tube and in the aperture 141 and connected directly to the coupling member 149, the valve-stem nut 145 fitting in the counterbore of the aperture 141 with its tube-contacting face flush with that of the fillet 142, and the nut being screwed to such position on the valve-stem as to hold the head 19ª of the latter away from the inner wall of the tube during vulcanization.

In Fig. 7 the tube 13ª is shown as being vulcanized between mold-sections 162, 163 defining an oblate mold cavity and having their parting planes positioned as above described, but being without steam cavities and adapted to be mounted in a platen press.

The use of the inert gas is of advantage in that it avoids oxidation of the tube and effects a desirable drying of the melted gelatin, when the gelatin block is used, and the operation of withdrawing the inert gas from the tube to conserve it provides the attendant advantage of loosening the tube from the mold, especially when the tube is introduced to the mold in a collapsed condition as described, so that it is substantially free of contained air. The use of inert gas is also of especial advantage in connection with the vertical position of the press, since it involves no water of condensation, which is not readily eliminated from a hollow article such as an inner tube or the like in the horizontal position which is incident to the use of the vertical press.

The employment of mold members having oblate cavities not only provides a large number of mold cavities in a press of given height, but produces an inner tube which may have when uninflated an outer or tread diameter greater than that of the tire cavity in which it is to be used and an inner diameter less than that of the tire cavity while having a cross-sectional perimeter only equal to or less than that of the tire cavity, so that the tube readily may be inserted in the tire and when inflated therein will have rubber in its tread portion under compression, for puncture-proof purposes, by reason of the flexure of that portion, and will fit the tire cavity at the beads by longitudinal stretch and without either longitudinal or transverse wrinkling. Still a third advantage of the oblate form of mold cavity, when inert gas is employed for distending the hollow article therein, is that a relatively small amount of the gas and a relatively small power demand upon the pump 156 is required as compared with a mold cavity of circular cross-sectional form and of equal length of perimeter. The comparative lightness of the mold members incident to the oblate form of cavity also calls for a comparatively small power consumption for operating the ram 113.

The oblate form of mold cavity is especially desirable in connection with the vertical position of the press because it avoids the necessity of the operator working at excessively different elevations for a press of given capacity, and the vertical position of the press is of advantage in connection with the means for locking adjacent mold members together, since gravity acts in an axial direction upon the molds throughout the series and consequently exerts upon them no mis-aligning force.

The vertical position of the press also is of advantage in connection with the "buttoning" of the U-folded tube onto the annular flange 137, as it causes the upper fold of the tube to be urged by gravity toward the middle of the tube throughout its circumference, for neat reception of the upper mold member.

The specific form of the mold members shown, in which the inner parting "plane" 136 is above the middle line of the inner periphery of the molding cavity, is of advantage in the vertical type of press in that it may provide for the steam cavity 121 a floor of which all parts slope toward the annular outer side, for full expulsion of water of condensation, while the next lower steam cavity extends well up about the inner periphery of the tube 13ª so as to provide the necessary uniformity of heat application transversely about the tube.

The feature of sliding the flexible pipe 146 outwardly through the aperture 141 of the mold member, as shown in Fig. 8, is of especial advantage in the vertical press, as it permits the mounting of the tube to be vulcanized and the removal of the vulcanized tube with respect to the flexible pipe at a position outside of the vertically limited space between the upper and lower sets of mold members.

The U-folding of the tube in conjunction with the use of a mold having an oblate molding cavity relatively narrow in a direction parallel with its axis permits the molding of a tube originally flattened in a radial direction to a form in which it is flattened in an axial direction.

It is thus apparent that my invention, while not limited in scope to a combination of all of the features described, provides a combination of numerous features each having especial advantages when employed in conjunction with one or more of the others.

My invention is susceptible of various modifications within the scope of the appended claims.

I claim:

1. The method of making an annular rubber tube which comprises forming the tube with a re-entrant fold giving it a double-walled U-form in cross-section with a relatively thick wall on the inside of the turn of the U, enclosing the tube in a mold cavity having a cross-sectional form of substantially less maximum dimension in an axial than in a radial direction, distending the tube in the mold by internal fluid pressure, and vulcanizing the tube while it is thus distended.

2. The method of making a hollow rubber article having a valve-stem in a wall thereof which comprises enclosing the valve-stem in a block of soft but cohesive material adapted to be melted by the heat of vulcanization, enclosing the said block with the valve-stem therein in the hollow article, enclosing the article in a mold, supporting the valve-stem out of contact with the inner surface of the article while holding the article distended in the mold by internal fluid pressure and vulcanizing the article, and thereafter mounting the valve-stem in a wall of the article.

3. In combination with vulcanizing apparatus for articles having inflating stems, a block of soft but cohesive material having the valve stem embedded therein, the said material being adapted to prevent the valve-stem from damaging the article in the mounting of the latter in the vulcanizing apparatus and being adapted to be rendered non-cohesive by the vulcanizing heat.

In witness whereof I have hereunto set my hand this 27th day of March, 1926.

JOHN R. GAMMETER.